June 1, 1943.  D. R. SHOULTS ET AL  2,320,833
CONTROL SYSTEM
Filed March 29, 1941
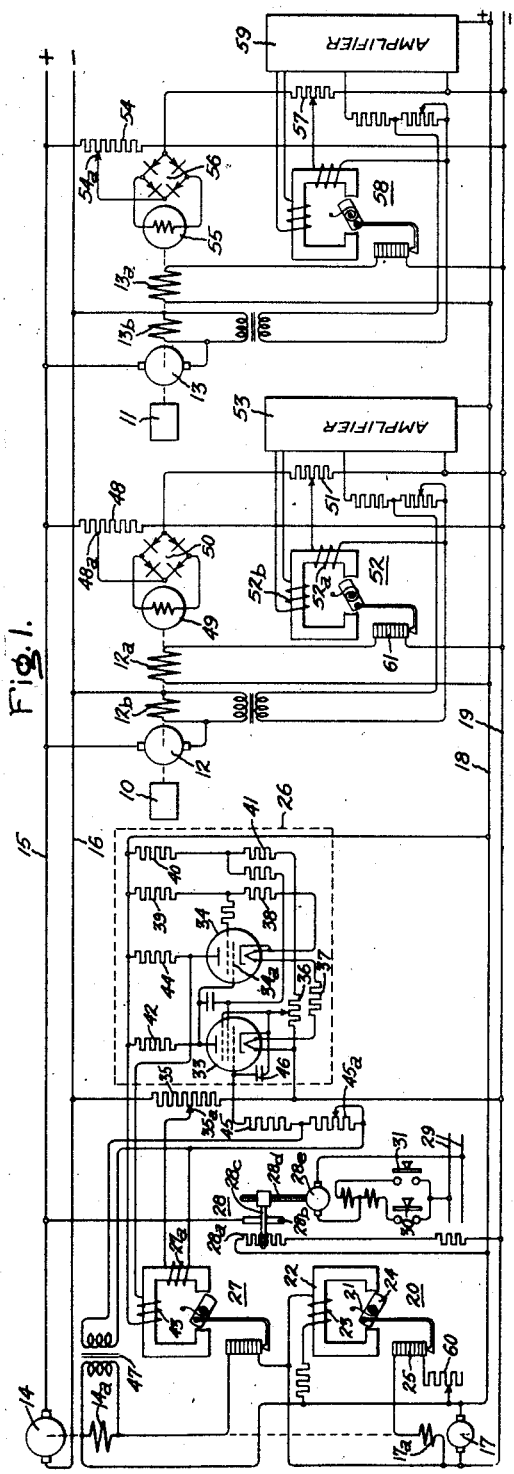
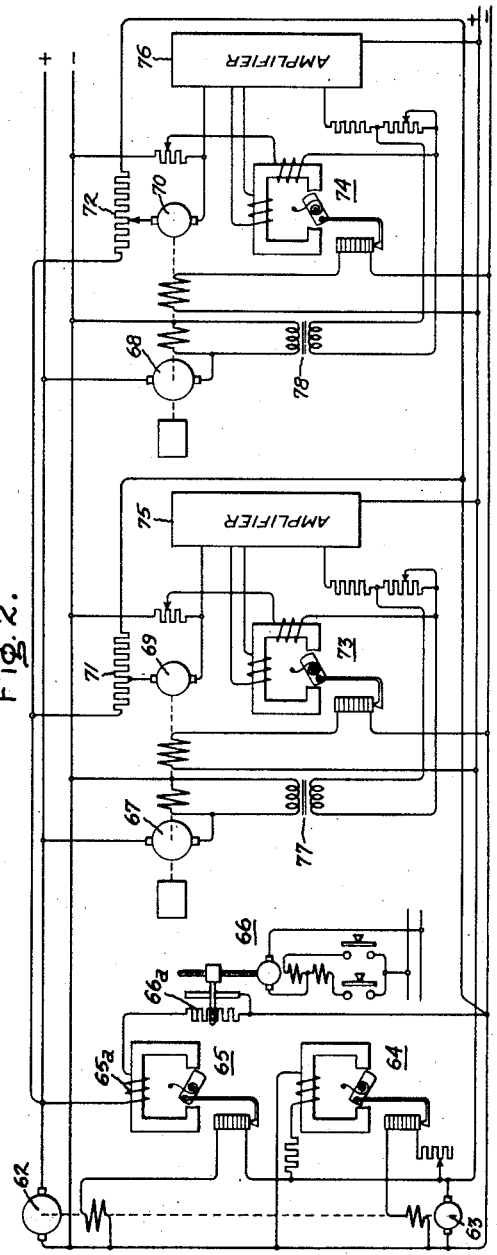
Inventors:
David R. Shoults,
Frederick E. Crever,
by Harry E. Dunham
Their Attorney.

Patented June 1, 1943

2,320,833

UNITED STATES PATENT OFFICE 2,320,833

CONTROL SYSTEM

David R. Shoults and Frederick E. Crever, Schenectady, N. Y., assignors to General Electric Company, a corporation of New York Application March 29, 1941, Serial No. 385,902

2 Claims. (Cl. 172—293)

This invention relates to control systems, more particularly to systems for controlling sectionalized apparatus or machines having a plurality of elements operating successively on a length of material and it has for an object the provision of a simple, reliable and improved control system of this character.

More specifically, the invention relates to control systems for sectionalized apparatus and machines in which an individual driving motor is provided for each section and in which the sections are required to operate in predetermined speed relationships with each other.

One example of a sectionalized machine having a plurality of sections operating successively on a length of material is a sectionalized paper making machine. Owing to various conditions which are present in making different grades of paper, the web may either stretch or shrink between certain sections of the machine. On account of this change in length between sections which is referred to as "draw," the sectional drive motors must operate in predetermined speed relationships with each other such that the web will neither be broken nor have loops formed therein between the sections.

Heretofore, integrating type regulators have been used to control the speed of each sectional drive motor with relation to some master speed device to provide the required speed relationships between the sectional drive motors.

In general, these regulators have embodied an adjustable ratio of drive between the sections being driven and the motion transmitting device which operates one element of a differential device.

To change the speed of a sectional drive motor relative to the speed of the master device, it has been necessary to shift a belt on a pair of cone pulleys or make the appropriate ratio adjustment between the sectional motor and the regulator by other suitable means. The differential or integrating device then proceeded slowly to make the necessary change in the motor field setting thereby to bring the speed to the new value. This has been found to be disadvantageous in installations in which the changes in draw are made very slowly because in the systems described in the foregoing it has been necessary for the operator to estimate the amount of draw by estimating the amount of displacement between relative motions, and because of the difficulties in estimating the phase displacement between relative motions the operator has never been completely certain when a change in draw has been completed. Therefore, a further object of this invention is the provision of a regulating system having greatly increased speed of response.

Furthermore, the speed regulating systems used heretofore have embodied large amounts of expensive apparatus and accordingly a further object of this invention is the provision of a regulating system in which the amount of control apparatus required is substantially reduced and in which the cost is likewise materially reduced.

In carrying the invention into effect in one form thereof, the voltage of a generator which may be either the adjustable voltage supply generator for the sectional motor or the exciter for the supply generator, is utilized as a master or reference voltage with which the speed of each of the sectional drive motors is compared. This comparison is accomplished by providing a tachometer generator to be driven by each sectional motor and means responsive to the difference between a portion of the supply generator or exciter voltage and the voltage of each tachometer generator for controlling the speed of the sectional motor so as to reduce this differential voltage to a predetermined value which is preferably substantially zero. In order to provide speed adjustment for the draw between sections, means are provided for comparing the tachometer generator voltages with the selectable portions of the exciter or supply generator voltage.

For a better and more complete understanding of the invention, reference should now be had to the following specification and to the accompanying drawing of which Fig. 1 is a simple diagrammatical illustration of an embodiment of the invention and Fig. 2 is a simple diagrammatical illustration of a modification.

Referring now to the drawing, a plurality of elements which operate successively on a length of material, such for example as the rolls 10 and 11 of a paper making machine, are driven by motors 12 and 13 respectively. Although but two sections of the paper making machine are indicated in the drawing, it will be understood that a paper making machine actually has a much larger number of sections. However, two sections are sufficient to illustrate the present invention.

Although the motors 12 and 13 may be of any suitable type, they are preferably direct current motors and are supplied from a suitable source of power such as represented by the adjustable voltage generator 14 to the terminals of which the motors 12 and 13 are connected by means of conductors 15 and 16. It may be assumed that the conductor 15 is the positive supply bus and that the conductor 16 is the negative supply bus. The motors 12 and 13 are provided with main field windings 12a and 13a respectively and with commutating field windings 12b and 13b respectively. The generator 14 is provided with a main field winding 14a which is supplied from a suitable source of excitation such as represented by the exciter 17. The supply generator 14 and exciter 17 are driven by any suitable driving means (not shown) at a speed which is preferably substantially constant.

The field windings 12a and 13a of the sectional drive motors 12 and 13 are supplied from the exciter 17 to which they are connected by means of conductors 18 and 19. The conductor 18 may be considered to be the positive bus and the conductor 19 may be considered to be the negative bus.

The exciter 17 is provided with a self-excited field winding 17a. Suitable voltage regulating means 20 are provided for maintaining the voltage of the exciter constant at some desired predetermined value such for example as 250 volts. The voltage regulator 20 comprises a voltage responsive element of the torque motor type which is balanced against a spiral spring 21. The torque motor directly operates a wide range, quick acting rheostat. The stator of the torque motor comprises a U-shaped magnetic core 22 upon which is mounted a D. C. coil 23. The rotor member is a bar type armature 24 of magnetic material mounted on a shaft between the poles of the stator core in such a way that the armature tends to align itself with the stator pole pieces when the coil 23 is energized. The spiral spring 21 mounted on the torque motor shaft tends to rotate the armature in a clockwise direction. The torque motor armature 24 is connected by a link to the rheostatic element 25 so as to operate the rheostatic element directly.

The torque motor armature has sufficient torque to counterbalance that exerted by the spiral spring and rheostatic element, and it is designed to hold a current in the coil 23 that varies only slightly with the position of the rheostatic element. In other words, regulator 20 is designed to have a slightly drooping characteristic.

The rheostatic element is composed of a stack of special non-metallic resistance material. When the coil 23 is deenergized and the rotor 24 is held in the position illustrated by the spiral spring 21, maximum pressure is applied to the stack 25 and the resistance is minimum. When the coil 23 is energized and the rotor member 24 is rotated in a counterclockwise direction against the tension of the spiral spring 21 sufficiently to relieve the pressure on the stack 25, the resistance is maximum.

The voltage responsive coil 23 of the regulator is connected across the armature of the exciter 17 and the rheostatic element 25 comprising the stack of non-metallic resistance material is connected in series relationship with the field winding 17a of the exciter. When the voltage of the exciter 17 is at the normal predetermined and desired value, the current in the energizing winding 23 is of such a value that all the forces of the regulator are balanced and the rotor is stationary. The voltage regulator for the supply generator 14 comprises an amplifier of the electronic type shown in detail within the dotted rectangle 26 and a unit 27 which is substantially identical with the unit 20 described in the foregoing. The amplifier 26 is designed and connected to respond to the differential voltage between a selectable portion of the voltage of exciter 17 and the terminal voltage of the supply generator 14. For the purpose of selecting a portion of the voltage of exciter 17 with which the voltage of the generator 14 is to be compared, a motor driven potentiometer 28 is provided. This potentiometer comprises a resistance element 28a connected across the exciter buses 18 and 19, the stationary contact rail 28b connected to the positive supply generator bus 15 and a movable contact member 28c which bridges the contact rail 28b and the resistance element and which is advanced or withdrawn by means of the motor driven screw 28d when the pilot motor 28e is energized. As shown, the pilot motor 28e is provided with a split series field winding and may be connected to a supply source 29 through one or the other of the split series field windings in response to operation of one or the other of the manually operated type push button switches 30 and 31. It may be assumed that when the push button 31 is depressed to bridge its stationary contacts, the motor 28e is connected to the source 29 to rotate in a direction to move the contact member 28c upward thereby to increase the portion of the exciter voltage with which the voltage of generator 14 is to be compared, and that when the push button 30 is depressed to bridge its stationary contacts, the motor 28e is energized to rotate in the reverse direction.

The amplifier 26 is an electronic device primarily designed for use in conjunction with a regulator such as regulator 27. The combination of the two devices forms an equipment that operates with substantially zero power input from the source to be regulated, and it can be set to operate at substantially zero voltage input. The regulator 27 acts as a power output device. Amplifier 26 is essentially a two-stage electronic amplifier employing a pentode valve 33 as a voltage amplifier and a beam power amplifier tube 34. The device contains a rheostat 35 for adjustment of sensitivity and also contains a rheostat 36 for adjustment of voltage level or bias and also has provision for anti-hunting. All filament, anode, screen, and grid potentials are obtained from the exciter buses 18 and 19 through suitable voltage dividers. The filaments of the two valves are connected in series with each other and with resistors 37, 38 and 39 across the exciter buses 18 and 19. Another voltage divider circuit is formed by resistors 40, 41 and the rheostat 36. This voltage divider circuit provides the screen and cathode voltages of the pentode valve 33. The two valves are coupled together by connecting the grid 34a of valve 34 to the junction of resistors 42 and the anode of valve 33. Resistor 42 is the anode circuit load for the valve 33. The anode circuit load for valve 34 is the main coil of the regulator 27. Resistor 44 is connected across this coil as a discharge resistance. Resistor 45 and capacitor 46 constitute an input filter for the pentode valve 33.

It will be noted that the upper terminal of the resistor 35 is connected to the negative supply generator bus 16. The lower terminal of the resistor 35 is connected to the negative exciter bus 19. Since the positive supply generator bus 15 is connected to a point of intermediate voltage on potentiometer 28 which is connected across the exciter buses 18 and 19, it will be clear that there is applied to the terminals of resistor 35, a voltage which is equal to the difference between the voltage of supply generator 14 and that portion of the exciter voltage which is selected by the movable contact arm 28c of the potentiometer. Resistor 35 is provided with a movable contact member 35a so that either all of this difference voltage or a selectable portion of it, depending upon the setting, is applied to this movable contact member 35a which connects through a feedback coil 27a on the regulator 27 through resistors 45a and 45 to the grid of valve 33. The secondary winding of a stabilizing transformer 47 is connected in parallel with the resistor 45a. Thus, the difference between the voltage of generator 14 and the selected portion of the exciter voltage 17 is applied between the grid and cathode of valve 33 through the feedback coil 27a on the regulator and the secondary of the stabilizing transformer 47 in such a way as to make the grid of valve 33 more negative with respect to the negative exciter bus 19 and hence more negative with respect to its cathode, which operates at a fixed voltage with respect to the negative exciter bus 19. A more negative grid voltage of valve 33 decreases its anode current and hence its anode becomes more positive. Therefore, the grid of valve 34 becomes more positive and this increases the anode current of valve 34 and thereby increases the current flowing in the operating coil 43 of regulator 27. The regulator then decreases the resistance in the field circuit of supply generator 14 thereby to increase the voltage of the generator and to reduce the difference between the generator voltage until the difference between the generator voltage and the selectable portion of the exciter voltage is a predetermined low value which is preferably substantially zero.

Thus the voltage of the supply generator 14 is compared with a selectable portion of the exciter voltage and, by the action of the regulator just described, is matched with and maintained equal to the selectable portion of the exciter voltage.

For the purpose of comparing the speed of the sectional motor 12 with the voltage of the exciter 17 or a selectable portion thereof, a potentiometer resistance 48 is connected from the negative exciter bus 19 to the positive generator bus 15 which in turn is connected to the movable contacts 28c of the potentiometer 28 which is connected across the exciter buses 18 and 19. An alternating current tachometer generator 49 is connected to the shaft of the sectional motor 12 so as to be driven thereby and to generate a voltage proportional to the speed of sectional motor 12. In order to compare the alternating voltage of tachometer generator 49 with the direct current voltage of the exciter 17, it is necessary to rectify the alternating voltage and for this purpose a full wave rectifier 50 of the surface contact type such as the well known copper oxide rectifier, is provided. One output terminal of the rectifier 50 is connected to fixed point 48a on the potentiometer 48 and the other output terminal is connected to the upper terminal of potentiometer 51 and thence through the feedback coil 52a of regulating unit 52 to the grid of an amplifier 53 which is identical with the amplifier shown within the dotted rectangle 26 and described in detail in the foregoing. The potentiometer resistor 51 corresponds with the resistor 35 of the amplifier shown in the dotted rectangle 26. The regulating unit 52 is identical in all respects with the regulating unit 27 and accordingly, a repetition of the description of this device is omitted. Since the amplifier 53 is identical with the amplifier contained within the dotted rectangle 26 it is shown conventionally in the drawing for the purpose of simplification.

For the purpose of comparing the speed of the sectional motor 13 with the voltage of the exciter 17, a potentiometer 54 is provided at the section driven by motor 13 and has the same connection to the system as the potentiometer 48 at the section driven by motor 12. A tachometer generator 55 is driven by the sectional drive motor 13 and generates an alternating voltage proportional to the speed of motor 13. This alternating voltage is rectified by means of the full wave rectifier 56, one output terminal of which is connected to the movable contact 54a of the potentiometer 54 and the other output terminal of which is connected to one terminal of the potentiometer 57 which corresponds to the potentiometers 35 and 51 already described. The regulating device for the section driven by motor 13 is completed by a unit 58 corresponding to the regulating units 27 and 52 and with an amplifier 59 which is identical with the amplifiers 26 and 53. In order to provide for draw adjustment between the sections driven by the motors 12 and 13, the movable contact 54a may be moved to any selected point on the potentiometer 54 which is calibrated in terms of draw adjustment. By this means the speed of the motor 13 can be compared and matched with a selected portion of the voltage of exciter 17 and maintained at this value by means of the regulating device comprising the unit 58 and the amplifier 59.

With the foregoing understanding of the elements and their organization in the completed system, the operation of the system itself will readily be understood from the following detailed description: It is assumed that the generator 14 and the exciter 17 are being driven by their driving means at a suitable speed and are generating the voltages which they are designed to generate.

The regulator 20 maintains the voltage of the exciter 17 constant at a value determined by the setting of the rheostat 60, in the manner described in the foregoing.

Similarly, the regulating device comprising the regulating unit 27 and the amplifier 26 regulates the voltage of the supply generator 14 to a value determined by the setting of the motor driven potentiometer 28, as described in the foregoing.

The sectional drive motor 12 operates at a speed which is proportional to the voltage of the supply generator 14 and is maintained constant at a value such that the voltage generated by the tachometer generator 49 driven by the motor 12 is equal to a selected portion of the exciter voltage. If the speed of the motor 12 should increase above the desired predetermined value, the difference voltage between the tachometer generator 49 and the exciter 17 would increase, and this increased difference voltage would cause the amplifier 53 to supply an increased current to the main operating coil 52b of regulator 52. In response to this increased current, the rotor of regulator 52 will be rotated in a clockwise direction to increase the pressure on the stack of non-metallic resistance element 61 thereby to increase the current flowing in the field winding 12a of motor 12. The increased field strength of motor 12 reduces its speed. This continues until a balanced condition is reestablished.

If the speed of the motor 12 decreases below the predetermined desired value, the rotor member of the regulating device 52 will rotate in a counterclockwise direction to lessen the pressure on the stack 61 thereby to increase the resistance in the field circuit and to decrease the current flowing in the motor field winding 12a. This decreases the field current and causes the speed of the motor to increase and this action continues until a balanced condition is reestablished.

The operation of the section driven by motor 13 is identical with the operation of the section driven by motor 12 already described, with the exception that the speed of the motor 13 can be varied in accordance with the required draw adjustment to provide any desired speed relationship between the motor 13 and the motor 12 by movement of the movable contact 54a to the correct position on the calibrated potentiometer 54.

The modified system of Fig. 2 differs from the system of Fig. 1 in that the voltage of the supply generator 62 is not compared with nor regulated by the voltage of the exciter 63. As in the system of Fig. 1, the voltage of the exciter 63 is maintained constant by means of a regulating device 64 that is identical with the regulating device 20 of Fig. 1. For maintaining the voltage of the supply generator 62 constant a regulating device 65, which is similar to the regulating device 64, is provided. The main coil 65a of this regulator is connected across the terminals of the generator 62 and the resistance element 66a of the motor operated rheostat 66 is connected in series with the operating coil 65a of the regulator. The motor operated rheostat 66 adjusts the setting of the regulator 65 so that the regulator 65 maintains the voltage of the supply generator 62 constant at a predetermined but adjustable value. The operation of the regulators 64 and 65 is in all respects identical with the operation of the regulator 20 of Fig. 1 and accordingly a repetition of the description of the operation is omitted in the interest of brevity.

The control for the sectional drive motors 67 and 68 is identical with the control for the sectional drive motors 12 and 13 of Fig. 1 with the exception that the tachometer generators 69 and 70 which provide the control voltages proportional to the speeds of the sectional drive motors 67 and 68 are of the direct current permanent magnet type, and with the further exception that the potentiometers 71 and 72 are connected with the terminals of the supply generator 62 at the same point that the coil 65a of the generator voltage regulator 65 is connected. The connection of the rheostats 71 and 72 directly to the terminals of the supply generator eliminates the effect of line drop and thereby increases the accuracy of the control.

The structure and interconnections of the speed regulators 73 and 74, the electronic amplifiers 75 and 76, and the stabilizing transformers 77 and 78 are identical with the structures and interconnections of the corresponding elements in the modification of Fig. 1.

The operation of the controls for the sectional drive motors 67 and 68 is identical with the operation of the controls for the sectional drive motors 12 and 13 of Fig. 1 with the exception of the tachometer generators 69 and 70 generate a direct voltage instead of an alternating voltage, and accordingly a detailed description is omitted in order to avoid repetition.

Although in accordance with the provisions of the patent statutes, this invention is described as embodied in concrete form and the principle of the invention has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A control system for a sectionalized machine having a plurality of elements operating successively on a length of material subject to stretch or shrinkage between said elements comprising an individual electric motor for driving each of said elements, an adjustable voltage generator for supplying said motors, said generator being provided with a field winding, an exciter for exciting said field winding, a regulator for maintaining the voltage of said exciter substantially constant, a second regulator responsive to the voltage of said generator for maintaining the voltage of said generator substantially constant, a speed regulator for each of said motors comprising a tachometer generator driven by each of said motors and means responsive to the difference between a portion of said generator voltage and the voltage of said tachometer for controlling the associated motor to reduce said differential voltage to a predetermined low value, and means for varying said portion of said generator voltage for certain of said speed regulators thereby to cause said motors to operate in predetermined speed relationship with each other.

2. A control system for a sectionalized machine having a plurality of elements operating successively on a length of material subject to stretch or shrinkage between said elements comprising an individual electric motor for driving each of said elements, an adjustable voltage generator for supplying said motors, said generator being provided with a field winding, an exciter for exciting said field winding, a regulator for maintaining the voltage of said exciter substantially constant, a second regulator responsive to the voltage of said generator for controlling the excitation of said generator to maintain the voltage of said generator substantially constant, a speed regulator for each of said motors comprising a direct voltage tachometer generator driven by each of said motors, and means responsive to the difference between a portion of said supply generator voltage and the voltage of said tachometer generator for controlling the associated motor to reduce said differential voltage to a predetermined low value, and means for varying said portion of said generator voltage for certain of said speed regulators thereby to cause said motors to operate in predetermined speed relationship with each other.

DAVID R. SHOULTS.
FREDERICK E. CREVER.